United States Patent [19]
Schinkel et al.

[11] Patent Number: 5,122,415
[45] Date of Patent: Jun. 16, 1992

[54] SEALABLE MULTILAYERED FILMS WITH IMPROVED TRANSPARENCY

[75] Inventors: Ingo Schinkel, Walsrode; Jürgen Böhner, Bomlitz, both of Fed. Rep. of Germany

[73] Assignee: Wolff Walsrode AG, Walsrode, Fed. Rep. of Germany

[21] Appl. No.: 581,257

[22] Filed: Sep. 10, 1990

Related U.S. Application Data

[63] Continuation of Ser. No. 221,814, Jul. 20, 1988, abandoned.

[30] Foreign Application Priority Data

Aug. 7, 1987 [DE] Fed. Rep. of Germany ....... 3726265

[51] Int. Cl.$^5$ .................. B32B 27/32; B32B 27/08
[52] U.S. Cl. ................... 428/349; 428/35.2; 428/35.4; 428/35.7; 428/516; 428/520; 428/910
[58] Field of Search ............ 428/35.4, 35.2, 35.7, 428/349, 516, 520, 910

[56] References Cited

U.S. PATENT DOCUMENTS

| | | | |
|---|---|---|---|
| 4,147,827 | 4/1979 | Breidt, Jr. et al. | 428/519 X |
| 4,230,767 | 10/1980 | Isaka et al. | 428/349 |
| 4,275,120 | 6/1981 | Weiner | 428/516 |
| 4,391,862 | 7/1983 | Bornstein et al. | 428/516 X |
| 4,419,411 | 12/1983 | Park | 428/516 |

FOREIGN PATENT DOCUMENTS

| | | |
|---|---|---|
| 0217598 | 8/1987 | European Pat. Off. |
| 0213698 | 11/1987 | European Pat. Off. |
| 0255622 | 10/1988 | European Pat. Off. |
| 3247998 | 6/1984 | Fed. Rep. of Germany |
| 2055688 | 11/1981 | United Kingdom |

Primary Examiner—P. C. Sluby
Attorney, Agent, or Firm—Sprung Horn Kramer & Woods

[57] ABSTRACT

Multilayered films with a special sealing layer which is applied only to one side have improved properties, in particular improved transparency.

13 Claims, 1 Drawing Sheet

SEALABLE MULTILAYERED FILMS WITH IMPROVED TRANSPARENCY

This application is a continuation of applicant's previously filed application Ser. No. 221,814, filed Jul. 20, 1988, now abandoned.

The present invention relates to packaging material consisting of multilayered films which have only one heat sealing layer, preferably on the basis of special olefin polymers.

Figure 1:
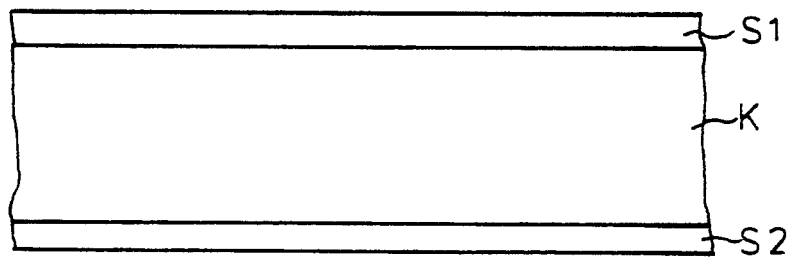

Packaging materials, especially wrappings, consisting of sealable olefinic multilayered films have long been known; see EP-A-27 586, U.S. Pat. No. 4,348,457, DE-A-31 14 171, U.S. Pat. No. 4,400,428, DE-A-35 17 082, DE-A-35 43 118 and DE-A-32 47 998. To ensure that all the seals of the package will be sufficiently secure in practical use, it is regarded as essential to use a multilayered film comprising a base layer K which carries a heat sealing layer on both surfaces S1 and S2 (see FIG. 1). It is only with such an arrangement that the two surface layers of these packages could be sealed together sufficiently firmly. It is for this reason that wrappings, e.g. of stretched multilayered films having a base layer of polypropylene which was initially not sealable and heat sealing layers of polybutene-1 or of copolymers and/or terpolymers of butene-1, e.g. mixtures of ethylene/-propylene/butene-1 terpolymers and/or propylene/butene-1 copolymers were invariably produced only from multilayered films in which the base layer was covered with the above mentioned heat sealing material on both sides.

Since the known wrappings produced from multilayered films having a heat sealing layer on both surfaces of the base layer do not satisfy all requirements in their optical properties and in their performance characteristics, it was an object of the present invention to provide packaging materials of the above mentioned type which would show a marked improvement compared with the known packaging materials, especially with regard to their optical properties.

The present invention relates to packaging materials composed of multilayered films which are stretched at least monoaxially but preferably biaxially and comprise a base layer K and a sealing layer S, characterised in that the package is sealed mainly by only sealing the surfaces S and K together and/or S and S together and in that the multilayered films used comprise a base layer of polypropylene only one surface of which carries a heat sealable outer layer of 1. 35 to 100% by weight, preferably 38 to 95% by weight, of olefin polymers of
   A) at least one copolymer, preferably a terpolymer, containing a total of polymerized units of
   a) 65 to 82% by weight of propylene,
   b) 25 to 14% by weight of butene-1 and
   c) 10 to 4% by weight of ethylene, and
   B) 0 to 7% by weight of a copolymer of ethylene and butene-1,
   the sum of A) and B) and the sum of a), b) and c) always being 100% by weight and the proportion of polymerized monomers in components A) and B) always adding up to 65 to 82% by weight of propylene, 25 to 14% by weight of butene-1 and 10 to 4% by weight of ethylene, and
2. 65 to 0% by weight, preferably 62 to 5% by weight of a propylene/ethylene copolymer containing 2 to 6% by weight, preferably 3 to 5% by weight of polymerized ethylene, the sum of 1. and 2. always amounting to 100%, and
3. optionally conventional auxiliary agents and additives.

The present invention further relates to a process for the preparation of packaging material of the type mentioned above, characterised in that the above mentioned multilayered films which have only one heat sealing layer are used and the necessary seals are produced by heat sealing the heat sealable outer layer against the uncovered surface of the base layer of polypropylene and if necessary also heat sealing the sealing layer against itself.

It was entirely unexpected to the person of the art to find that by using multilayered films which have only one heat sealable layer, it was possible to seal the heat sealable layer sufficiently firmly to the uncovered surface of the base polypropylene layer to produce a satisfactory package. In addition, the wrappings, e.g. of cigarette packets, have a tighter wrapover than those of multilayered films which have heat sealable layers on both sides of the base layer, and they also have substantially improved optical properties and greater stiffness. These improved optical properties are also found in other packaging materials according to the invention, e.g. in tubular packaging, in which, moreover, the scratch resistance is markedly improved.

The multilayered films used for the preparation of the packages according to the invention preferably have the following composition:

The base layer preferably consists of a polypropylene. An isotactic polypropylene having a density of from 0.9 to 0.91 g/cm$^3$ and a melt flow index of from 1 to 4 g/10 minutes at 230° C./21·2N (according to DIN 53 735) is preferably used. The base layer may contain up to 10% by weight of a hydrocarbon resin which is compatible with the polypropylene and has a molecular weight of from 500 to 1500 and a melting point below 100° C. or up to 10% by weight of the olefin polymers (A) of the heat sealing layer.

The olefin polymers (A) of the heat sealing layer, which are preferably composed of a propylene/butene-1/ethylene terpolymer and optionally an ethylene/butene-1 copolymer, should preferably have a melt flow index of from 0·1 to 16 g/10 minutes at 230° C. and 21·2N (DIN 53 735), most preferably from 4 to 10 g/10 minutes at 230° C. and 21·2N. The preparation of random terpolymers and random copolymers is state of the art and has been described, e.g. in Japanese Specification JA-OS 35 487/1974.

Component 2 of the heat sealing material is a propylene/ethylene copolymer which preferably has a melt index (determined according to DIN 53 735) of from 0·1 to 25 g/10 min., preferably from 3 to 10 g/10 min. at 230° C. and 21·2N. The preparation of such random copolymers is known to the man of the art and the copolymers are available commercially.

The multilayered films used for preparing the packages according to the invention may contain the usual additives and auxiliary agents such as slip agents, antiblocking agents and antistatic agents in the usual quantities.

The multilayered films according to the invention may also contain a gas barrier layer, preferably an oxygen barrier layer consisting of a saponified ethylene/vinyl acetate copolymer containing from 40 to 85 mol % of vinyl acetate units of which at least 90% by weight, preferably more than 96% by weight are saponified, and the multilayered films may also optionally contain conventional adhesion promoter layers.

The multilayered films used for the preparation of the packaging according to the invention may be produced by conventional processes such as laminating, coating or melt (co)extrusion, and the material for the heat sealing layer may advantageously be prepared by direct compounding. The multilayered films are advantageously stretched at least monoaxially, preferably biaxially. In the longitudinal direction they are preferably stretched in ratios from 5:1 to 7:1 and transversely in ratios from 7:1 to 10:1.

The base film of polypropylene in the multilayered films used for preparing the packaging according to the invention should preferably have a thickness of from 20 to 50 μm and the heat sealable layer should preferably have a thickness of from 0.8 to 2 μm, most preferably about 1 μm.

The packagings according to the invention are in particular wrappings, preferably for cigarette packets, and tubular wrappings with an overlapping seam.

For producing wrappings for cigarette packets, the sealing layer of the two layered film should lie on the outside of the package but for the production of tubular packages, it should lie on the inside.

The following test methods and methods of determining values and properties are used in the examples which follow:

Haze was determined according to ASTM D 1003-52.

The sealing seams were produced by low pressure sealing. The sealing apparatus used had smooth sealing jaws heated on one side and sealed with a pressure of 0.35N/cm$^2$ for 0.5 sec. The strength of the seal is the force required to separate the sealed seam produced at a given sealing temperature. The strength of the seal is given in N and obtained on a sample strip 15 mm in width. If the sealing strength is above 1N, it is sufficiently firm.

To determine the scratch resistance, the haze of the film, already mentioned above, is measured before and after scratching. The film is scratched by means of 40 g of dust free silicone carbide scattered over a film which is inclined to the horizontal by an angle of 45°.

EXAMPLE 1

To prepare the heat sealing material for the films used for the packages according to the invention, 58% by weight of a propylene/ethylene copolymer and 42% by weight of a random terpolymer composed of 71% by weight of propylene, 20% by weight of butene-1 and 9% by weight of ethylene units and having a melt index of 7 g/10 minutes at 230° C./21·2N are mixed with 2.5% by weight of erucamide, 0.15% by weight of a thermoplastic polyamide-12 as antiblocking agent and 0.5% by weight of N,N-bis-(2-hydroxyethyl)-($C_{12}$ to $C_{16}$)-alkylamine and the mixture is bonded by a conventional method to the base film of polypropylene which has a density of 0.905 g/cm$^3$ and a melt index of 3.3 g/10 minutes at 230° C./21·2N, and the film is then stretched so that a composite film which has been stretched in the longitudinal direction by 5:1 and transversely by 10:1 is obtained, the base film having a thickness of 20 μm and the sealing layer on one side of the base layer having a thickness of 1 μm.

Figure 2:
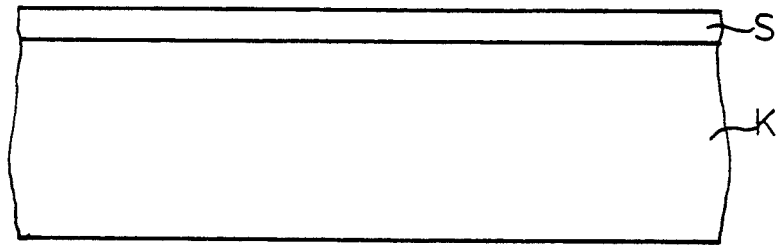

The construction according to the invention is illustrated by way of example in FIG. 2, in which K is the base layer of polypropylene and S the sealing layer which is applied on one side only.

COMPARISON EXAMPLE

A film was produced according to Example 2 of DE-A-29 41 909.

The tests carried out on the films according to the invention and on the comparison film are entered in the following table.

TABLE

|  | Example 1 | | Comparison Example 1 | |
|---|---|---|---|---|
| Haze (I) of the whole film | 0.9 | | 2.0 | |
| Scratch resistance, side: | S: 0.8/22.7 | K: 0.9/6.8 | S1 or S2: 1.4/24.1 | |
| Sealing | S against S | S against K | S1 against S1 | S1 against S2 |
| Sufficiently firm seal strength at 0° C. | 90 | 125 | 125 | 125 |

We claim:

1. A film for wrapping a product, wherein the said film has been stretched at least monoaxially, comprising a base layer consisting essentially of pure polypropylene and only one surface of the said base layer carrying a heat sealing layer of
    (i) from about 35 to up to 100% by weight, of olefin polymers of
        (A) at least one terpolymer containing a total of polymerized units of
            (a) 65 to 82% by weight of propylene,
            (b) 25 to 14% by weight of butene-1 and
            (c) 10 to 4% by weight of ethylene, and
        (B) up to 7% by weight of a copolymer of ethylene and butene-1, the sum of A) and B) and the sum of a), b) and c) always amounting to 100% by weight and the total amount of polymerized monomers in components A) and B) always adding up to 65 to 82% by weight of propylene, 25 to 14% by weight of butene-1 and 10 to 4% by weight of ethylene, and
    (ii) up to 65% by weight of propylene/ethylene copolymer containing 2 to 6% by weight of polymerized ethylene, the sum of (i) and (ii) always amounting to 100%, and
    (iii) optionally conventional auxiliary agents and additives,
and wherein the sealing obtained only by sealing the sealing layer against the base layer or against the sealing layer.

2. A film according to claim 1, for use in cigarette packets or other packages with tubular wrappings.

3. A film according to claim 1, wherein the weight % of (i) is 38 to 95.

4. A film according to claim 1, wherein the weight % of (ii) is 62 to 5.

5. A film according to claim 1, wherein the propylene/ethylene copolymer in (ii) contains 3 to 5% by weight of polymerized ethylene.

6. A film according to claim 1, wherein the film is biaxially stretched.

7. A film according to claim 1, wherein the olefin polymer (i) A) has a melt flow index of 0.1 to 16 g/10 minutes, measured at 230° C. and 21.2N.

8. A film according to claim 1, wherein the olefin polymer (i) A) has a melt flow index of 4 to 10 g/10 minutes, measured at 230° C. and 21.2N.

9. A film according to claim 1, wherein propylene-/ethylene copolymer (ii) has a melt flow index of 0.1 to 25 g/10 minutes, measured at 230° C. and 21.2N.

10. A film according to claim 1, wherein propylene-/ethylene copolymer (ii) has a melt flow index of 3 to 10 g/10 minutes, measured at 230° C. and 21.2N.

11. A film according to claim 1, wherein the polypropylene base layer comprises isotactic polypropylene having a density of 0.9 to 0.91 g/cm$^2$ and a melt flow index of 1 to 4 g/10 minutes, measured at 230° C. and 21.2N.

12. A film according to claim 1, wherein claim 1, which further comprises a gas barrier layer.

13. A film according to claim 12, wherein the gas barrier layer is an oxygen barrier layer comprising a saponified ethylene/vinyl acetate copolymer containing from 40 to 85 mole % of vinyl acetate units which at least 90% by weight are saponified.

* * * * *